Dec. 30, 1947.  R. A. RENDICH  2,433,480
X-RAY MARKER
Filed May 9, 1946  3 Sheets-Sheet 1
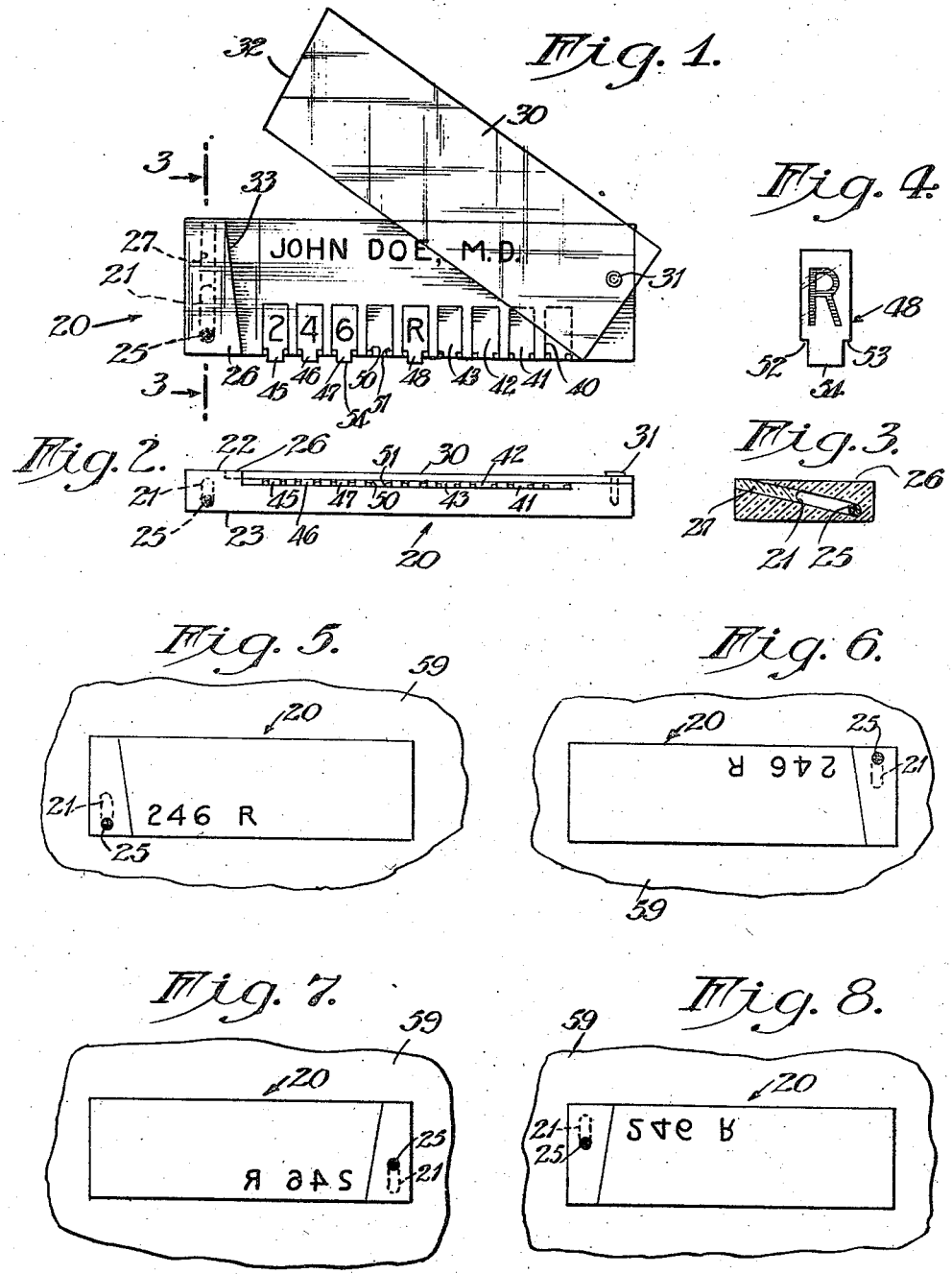
INVENTOR
RICHARD A. RENDICH
BY
ATTORNEYS Dec. 30, 1947.   R. A. RENDICH   2,433,480
X-RAY MARKER
Filed May 9, 1946   3 Sheets-Sheet 2

INVENTOR
RICHARD A. RENDICH
BY
*Pennie Edmonds, Morton Barrows*
ATTORNEYS

Dec. 30, 1947.  R. A. RENDICH  2,433,480
X-RAY MARKER
Filed May 9, 1946  3 Sheets-Sheet 3

INVENTOR
RICHARD A. RENDICH
BY
*Fenwick Edmonds, Morton Barrows*
ATTORNEYS

Patented Dec. 30, 1947

2,433,480

UNITED STATES PATENT OFFICE 2,433,480

X-RAY MARKER

Richard A. Rendich, Georgetown, Conn.

Application May 9, 1946, Serial No. 668,351

6 Claims. (Cl. 250—67)

This invention relates to markers for placing identifying data on radiographs and has for its object certain improvements in such markers.

It is customary, when taking radiographs of animals, of human beings for example, to place identifying data on the X-ray film simultaneously with its exposure to the X-rays. In an effort to indicate what portion of a patient has been X-rayed, the identifying data generally includes the letter "R" or "L" to designate the right or left section of the body, for example the right arm or the left arm, in addition to certain numbers useful in filing or otherwise identifying the particular radiograph. In taking a radiograph of the kind contemplated, the operator usually works with a horizontally disposed film mounted in a cassette over which is placed the portion or section of the patient's body to be X-rayed. Just before turning on the beam of X-rays, the operator places a marker with the identifying data over the film at some convenient part not covered by the body, such as along the margin of the film.

For this purpose, a simple marker is ordinarily employed. It consists of a transparent plastic holder with an elongated flat base and rim portions along each side bent back over themselves to provide grooves extending lengthwise of the base. The identifying insignia are in the form of radiopaque numerals and letters or other designs secured, such as by pasting, to rectangular pieces of the same transparent plastic material, which are then inserted in the grooves. For this purpose, lead numerals and letters are generally used, the lead being opaque to the X-rays and therefore capable of casting the desired shadows. If, for example, the identifying data is to be 246R, the desired numerals and letters are inserted in the grooves in that order; and the holder is placed over the film near its margin. If the operator has proceeded correctly, all will be in order.

-Unfortunately the operator may sometimes use the letter R (right), for example, when the letter L (left) should have been used. In addition, instead of placing the holder with its bottom or base toward the top of the film, the operator may reverse the order and inadvertently place it with the top toward the film. Since the film as made today has emulsion on both sides, it is impossible to tell from the developed film precisely how the patient was placed relative to the film. In case the position of the holder is accidentally inverted, the reverse side of the film will, of course, present the identifying data right side up but the radiograph may be said to be presented wrong side up.

If a radiologist could be certain just how the patient was positioned with respect to the film in order to take the radiograph, from his knowledge of anatomy he could promptly tell whether the latter should be R or L. Such precise knowledge is not possible, however, as radiographs are now generally taken. A great deal of confusion arises. Should the physician treat, or the surgeon operate, on the right or left side of the section of the patient X-rayed? What is greatly to be desired is a marker for placing identifying data on radiographs which will automatically indicate precisely the position of the patient with respect to the film when the radiograph was taken.

Investigation confirms my discovery that a marker may be designed having the necessary structural features to indicate automatically how the developed films or radiographs should be viewed in order to determine the position of the patient's body with respect to the film when the picture was taken.

In accordance with the invention, the marker comprises a holder for identifying insignia opaque to X-rays, the holder itself being at least in part radioparent to the X-rays. A conduit is associated with the holder, the conduit being tilted with respect to the bottom and the top of the holder so that an X-ray opaque substance in the conduit may readily seek the lower end of the conduit by gravity when the holder is placed on its bottom or its top.

These and other features of the invention will be better understood by referring to the accompanying drawings, taken in conjunction with the following description, in which—

Fig. 1 is a plan view of a marker illustrative of a practice of the invention, showing a pivoting cover in the open position for the insertion or removal of tabs with X-ray opaque insignia;

Fig. 2 is a side elevation;

Fig. 3 is a section on the line 3—3 of Fig. 1;

Fig. 4 is an enlarged plan view of an insertable and removable tab provided with opaque insignia;

Fig. 5 is a plan view of the marker as it appears when placed right side up over a film with the identifying data in normal reading position along the lower edge of the marker, as it would appear on the front side of the film;

Fig. 6 is a similar plan view with the marker still right side up but with the reading position of the data upside down;

Fig. 7 is a plan view of the marker as it appears when placed right side down over a film, with the identifying data in normal reading position along the lower edge of the marker, as it would appear on the back side of the film;

Fig. 8 is a similar plan view, with the marker still right side down, but with the reading position of the data upside down;

Figure 9:
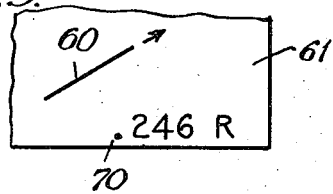
Figs. 9–18 are plan views diagrammatically illustrating developed films or radiographs to show what occurs when radiographs are taken with the marker placed over the undeveloped film in various positions, such as indicated in Figs. 5–8.

Referring first to Figs. 1, 2 and 3, the marker shown comprises a transparent holder 20 of elongated rectangular configuration having adequate depth or thickness to accommodate an internal conduit or channel 21 at one end tilted with respect to the top 22 and the bottom 23, the conduit being adapted to contain an X-ray opaque substance, such as a globule of mercury or a lead ball or slug 25. As more particularly shown in Fig. 3, the conduit may be provided by boring a hole into a raised end portion 26 of the body of the holder, preferably from the top transversely toward but not quite to the bottom, the upper or open end of the hole being closed with a suitable tight-fitting transparent plug 27 after the opaque substance has been inserted in the hole. The hole could, of course, be started from the bottom, in which case a transparent plug would be inserted from that end; or the hole could be bored completely through the holder, in which case a transparent plug would be inserted in each end. While the conduit may be placed in any desired position, as here shown, its ends terminate approximately at the base and above the top lines of the identifying data.

In the construction shown, the top of the main body of the holder is indented and fitted with a transparent movable cover 30 pivoted to the other end of the holder by a screw 31. The free end of the cover is cut on a bias line 32 slanting inwardly toward the lower edge, so as to fit against a complementary bias line 33 on raised under portion 26. The construction is such that when the cover is pivoted or swiveled into closed position, the top of the cover is in the same plane as the top of the raised end portion.

While not necessary, the name and address of the physician or radiologist in X-ray opaque letters and numerals may be integrally secured, for example, to the upper half of the main body of the holder so that each radiograph taken by or for him may always bear this information. The construction shown readily permits such an advantageous feature.

The lower half of the main body of the holder is provided with a plurality of spaced recesses 40, 41, 42 and 43, etc., generally, although not necessarily, rectangular in configuration, each of which is adapted to receive a suitable tab 45, 46, 47, 48, etc., bearing a suitable X-ray opaque insignia. The open end of each recess adjacent the lower edge of the holder is provided with a pair of spaced shoulders 50 and 51 at opposite corners adapted to hold the tabs in place when the cover is swung over the holder into its closed position. As shown in Fig. 4, which may be regarded as typical of all of them, the lower end of tab 48 is provided with a pair of cut-out corners 52 and 53 adapted to fit around the shoulders; the cut-out corners also helping to define a lip 54 which extends slightly beyond the lower edge of the holder when inserted in a recess. This lip may be grasped by the operator to facilitate insertion and removal of the tabs from the recesses. Each tab has an appropriate X-ray opaque insignia, such as a lead numeral or letter integrally secured thereto. As shown in Fig. 1, the identifying data 246R is placed in the holder by means of suitable tabs. This particular legend is used in Figs. 5 to 18 to illustrate the use of the marker.

As indicated above, Figs. 5 to 8 are plan views showing marker 20 placed over an undeveloped film 59 in four different positions. These positions, furthermore, illustrate in general all the ways in which an operator could place the marker; so that a consideration of the films after exposure to the X-rays and development should show how the physician can determine accurately how the film was placed with respect to the patient and thus determine in addition from his knowledge of anatomy precisely what section of the patient's body was radiographed.

In further illustration of the use of the marker, it will be assumed that the right side of a certain portion of a patient's body is radiographed with X-rays; that the letter R is the appropriate insignia to identify that right side; that a slanting line 60 appearing on each of the developed films 61 of Figs. 9 to 18 represents such right side; and that line 60 will slant upwardly toward the right, as indicated by the arrow, as one looks from left to right at the front, not the back, side of the radiograph.

When, for example, as appears from Fig. 5, the marker is properly placed over an undeveloped film 59 (that is, the marker is placed right side up over the film, with the identifying data in normal reading position, along the lower edge of the marker as it would appear on the front side of the film), line 60 should slant upwardly toward the right as one looks from left to right on the front, as distinguished from the back, side of the film. Furthermore, as indicated in Fig. 3, since opaque globule or ball 25 moves by gravity to the lower end of conduit or channel 21, to the base line of the legend 246R on the marker, it, the opaque globule, should leave a characteristic visible spot on the film near the base line of the legend.

That this should be so may be gleaned from Fig. 9, which is intended to show a developed film or radiograph as the physician first looks at it. The fact that a characteristic spot 70 appears along the base line of the legend at once indicates that the marker must have been placed right side up over the film, this position of the marker having caused the opaque globule or ball to move to that position by gravity due to the direction of tilt of the conduit or channel. This, coupled with the further fact that the legend is directly readable, assures the physician that he is looking at the front of the film as it was presented to the patient; and that slant line 60, therefore, correctly represents the part of the patient's anatomy as it was presented to the X-rays. His knowledge of anatomy will at once indicate to him whether the section shown is a left or right section. If, therefore, slant line 60 correctly represents a right section, he can at once tell that the letter R in the legend was correctly selected by the operator.

Figure 10:
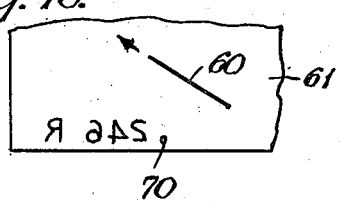

Now, if the physician should pick up the developed film and look at it as shown in Fig. 10, the position of characteristic spot 70 along the base line of the legend will at once indicate to him that the marker was placed right side up over the film when the radiograph was taken. But, since the legend is not correctly presented for reading, he can at once conclude that the radiograph should be viewed from the reverse side; and that when he does this, the front side of the radiograph is presented to him as the film was to the patient. When this is done, everything appears as it does in Fig. 9 and he can of course safely conclude that the letter R was correctly selected by the operator.

Figure 11:
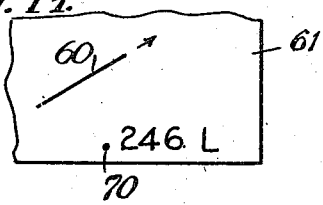

Assuming next that the physician views a radiograph as in Fig. 11, the position of spot 70 along the base line of the legend at once indicates that the marker was placed right side up over the film when the radiograph was taken. Since the legend is also directly readable, he can be certain he is looking at the front of the radiograph as the radiograph was taken. His knowledge of anatomy at once tells him that the section shown is a right section of the patient, although the letter L appears in the legend. It is, therefore, apparent to him that the operator should have placed the letter R instead of L in the holder. He is not misled by the mistake.

Figure 12:
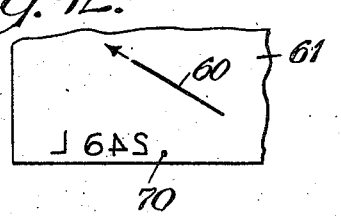

If the radiograph is viewed as shown in Fig. 12, the position of spot 70 along the base line of the legend again tells the physician that the marker was placed right side up over the film when the radiograph was taken. But, since the legend is not correctly presented for reading, he at once turns the radiograph and looks at it from the reverse side to tell precisely the position of the film when the radiograph was taken. When this is done, the radiograph will look as it does in Fig. 11, which makes it clear that the operator made a mistake in using the letter L instead of R.

Figure 13:
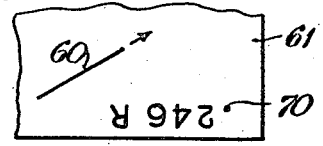

If the physician looks at a radiograph as it appears in Fig. 13, the position of spot 70 at the base line of the legend again indicates that the marker was placed right side up on the film when the radiograph was taken; although the legend itself is upside down. By swinging the radiograph around in the same plane, the legend will be directly readable. With his knowledge of anatomy, however, the physician again knows that the section represented by slanting line 60 is a right section of the patient's anatomy. From this, he can of course conclude that the letter R is properly present in the legend. In other words, the radiographs diagrammatically illustrated in Figs. 9 and 13 are exactly alike except that the legends indicate the marker was swung around right side up in its own plane when the latter radiograph was taken.

Figure 14:
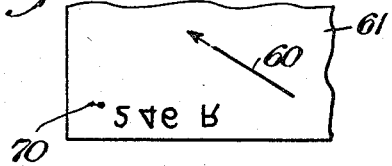

If the radiograph appears to the physician as shown in Fig. 14, the position of spot 70 at the base line of the legend promptly indicates that the marker was correctly placed right side up over the film, although the legend is not correctly presented for reading. It is, therefore, evident that the radiograph should be reversed to present the front side; and, since the legend is also upside down, the reversed radiograph should also be turned in its own plane correctly to present the legend for reading. With his knowledge of anatomy, the physician can promptly tell that the section represented by slanting line 60 is a right section of the patient's anatomy and that the letter R is correctly included in the legend. When the radiograph is reversed, but before turned in its plane, the section and legend will be presented as in Fig. 13.

In the case of each of the developed films illustrated in Figs. 9–14, the operator placed the marker right side up over the film when the radiograph was taken, although in various positions in that plane. This necessarily results when the marker is placed over the film as shown in Figs. 5 and 6. Figs. 9 to 12 may be considered as stemming from Fig. 5; and Figs. 13 and 14 from Fig. 6.

From what has already been said, it will be clear that if the marker is placed right side down over the undeveloped film, opaque globule or ball 25 shifts by gravity to the other end of conduit or channel 21, away from the base line of the legend; so that a developed film will have a characteristic spot 72 away from the base line of the legend, which at once indicates the marker was placed right side down over the undeveloped film. Any suitable way of differentiating the relative positions of the characteristic spots may of course be employed. In the construction shown, the opaque globule or ball shifts to a position well above, rather than at the level of, the top or roof line of the legend, so that there is no chance of confusing the base of the legend with the top or roof of the legend by the position of the characteristic spot when the marker is turned right side down.

Figure 15:
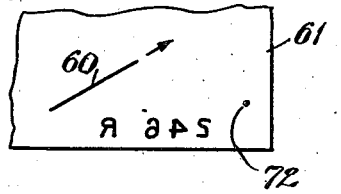

If the physician looks at a developed film as it appears in Fig. 15, the position of spot 72, substantially away from the base as well as the top or roof line of the legend, at once indicates to him that the operator placed the marker right side down over the film when the radiograph was taken. The fact that the radiograph must be reversed directly to read the legend also indicates that he is looking at the front side of the radiograph. In other words, he will know that he must look at the back side of the radiograph directly to read the legend and that he must look at the front side of the radiograph directly to read the radiographed section. When he looks at the front side of the radiograph he of course knows it is in the position it occupied when exposed to the X-rays, so that with his knowledge of anatomy, the physician may at once tell that a right section has been radiographed. The latter R, therefore, correctly appears in the legend.

Figure 16:
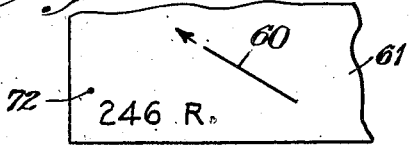

On the other hand, if the radiograph is viewed as appears in Fig. 16, the position of characteristic spot 72, substantially away from the base as well as the top or roof line of the legend, at once indicates that the marker was placed right side down over the film. The fact, however, that the legend is directly readable further indicates that he is looking at the back side of the radiograph. In order, therefore, to view the section as radiographed, the physician must reverse the radiograph so as to face the front side of the radiograph. When this is done, he recognizes that a right section of the patient's anatomy was radiographed and that the letter R correctly appears in the legend.

It will be clear from what has been said in regard to Figs. 11 and 12 that if the letter L had been inserted in the marker instead of R, when the radiographs illustrated in Figs. 15 and 16 were taken, the physician would readily observe that a mistake had been made because a right section of the patient's anatomy was in fact photographed.

Figure 17:
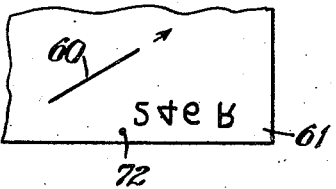

Assuming that the physician looks at a developed film as shown in Fig. 17, the position of characteristic spot 72 at a distance substantially away from the base of the legend, as well as from the top or roof line of the legend, at once indicates that the marker was placed right side down over the undeveloped film. The further fact that the legend is not directly readable, but should be looked at from the reverse, actually the back, side for that purpose, also indicates that he is looking at the front side of the radiograph; and that therefore the picture indicates the precise position of the patient when the exposure was made. It is also evident that the marker was turned in its own plane while right side down over the film. The physician will, of course, observe that the radiograph is that of a right side anatomical section and that the letter R therefore correctly appears in the legend.

Figure 18:
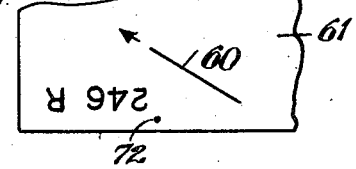

Finally, if the physician looks at the developed film as illustrated in Fig. 18, the fact that characteristic spot 72 again appears at a position well removed from the base as well as from the top or roof line of the legend at once indicates that the operator placed the marker right side down over the film when making the exposure. The further fact that the legend is directly readable, although the radiograph must be turned in its indicated plane, indicates to him that he is looking at the back side of the radiograph and that the radiograph should therefore be reversed in order to present the section as it was taken by the operator. His knowledge of anatomy again tells him that the radiograph is that of a right section of the patient and that the letter R is properly in the legend.

From the foregoing discussion, it is evident that in each of the developed films shown in Figs. 15-18, the operator placed the marker right side down, or wrong side up, over the film when the radiograph was taken, although in various positions in that particular plane. Such results necessarily follow when the marker is placed over the film as shown in Figs. 7 and 8. Figs. 15 and 16 may be considered as stemming from Fig. 7; and Figs. 17 and 18 from Fig. 8.

No matter how the operator places the marker over the film, right side up or right side down, by a simple examination of the developed film the physician can easily and quickly determine how the film was placed with respect to the patient. Once he has this information, his knowledge of anatomy will tell him precisely how the patient was positioned when the exposure was made, so that he need not be misled by the operator's failure to insert the correct L or R in the marker or by the operator's failure properly to place the marker over the film.

It will be clear to those skilled in this art that the marker of the invention readily lends itself to numerous modifications. While in the construction shown the conduit or channel tilts downwardly toward the base line of the legend or the area to be occupied by the legend when the marker is placed right side up, it will be clear that the conduit or channel could be tilted in the reverse direction. In the construction shown, the conduit or channel tilts transversely of the marker, while it could of course be tilted longitudinally or diagonally. Instead of a single conduit or channel, two or more could be employed. What is important is that a known fiducial point or part be selected for relating the characteristic spot and that this be kept in mind when examining the developed film.

In the discussion above, it is assumed that the letters L and R are employed to designate left and right sections, respectively. Other letters are of course employed to indicate the direction in which the radiographs are taken. Thus, AP is in the anterior-posterior direction; PA in the reverse, or posterior-anterior direction; LAT, in addition to L or R, in a lateral direction; LAT-M or LAT-MES in a lateral toward mid-line direction; M-LAT or MES-LAT in a mid-line toward lateral direction; IN-EX in an interior toward exterior direction; EX-IN in an exterior toward interior direction; etc. Such designations may of course also be used in conjunction with the marker, the position of the characteristic spot being relied upon to show precisely how the patient was placed with respect to the film or plate when the radiograph was taken.

As pointed out, the new marker is particularly useful when the radiograph is taken with the film or plate in a horizontal or substantially horizontal position. If the tilt of the film is as much or more than that of the conduit or channel, the opaque globule cannot of course move as it does when the marker is horizontally disposed.

The same principle is, however, adapted for a marker to be used when the film or X-ray plate is in an upright or vertical position, such as when a radiograph is taken of a patient's lungs while he stands in an upright position. To this end, the operator may secure a vacuum cup to the side of the vertical apparatus employed to take the radiograph, along the side and in front of the X-ray plate. A metal hook is attached to the vacuum cup and the marker is attached to the hook by means of a notch or notches in the under portion or back of the marker. Since the hook is of metal, its outline will of course appear on the radiograph. The position of the radiopaque ball or globule with respect to the metal hook will at once indicate the precise position of the marker with respect to the X-ray plate at the time of exposure. Since the notch or notches are in the bottom or rear of the marker, the marker must always be presented right side up or forward.

If the anatomical part and the film or X-ray plate are placed in an inclined plane, for example, as in a sinus examination, and the plane of the marker is such as to change the position of the radiopaque indicator in the channel, this will at once be recognized by the roentgenologist, who is familiar with the positions necessary for such examination.

Figure 19:
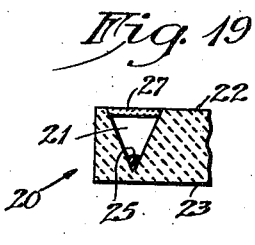
Figs. 19–34 are sectional views in part of modified forms of construction and radiographs resulting from their use.
Figures 20, 21:
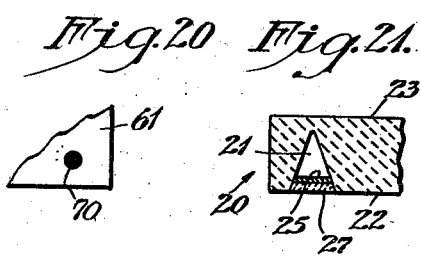
Figure 22:
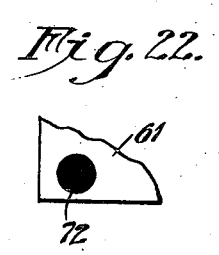

In addition to the forms of marker construction referred to, in which the characteristic spot shifts, other modifications can be employed, in which, for example, the characteristic spot varies in size and shape. Thus, instead of a cylindrical channel or channels, the channel may be a cone-shaped space extending, for example, vertically in the marker. If the apex of the cone is at the bottom and the base at the top of the marker, for example, the mercury in the cone would settle at the apex and appear as a relatively small globule when the marker is placed right side up over the film; but the mercury would settle to the base and spread thinly into a continuous relatively large disc when the marker is placed wrong side up over the film. The size of the characteristic spot on the radiograph would therefore indicate precisely how the marker was placed when the exposure was made. Reference may be made to Figs. 19 and 21, which illustrate in cross-section a portion of a marker having such a construction. In the case of Fig. 19, channel 21 is cone-shaped with its apex toward bottom 23, the base of the cone terminating in plug 27 integrally secured to top 22 of the holder. As shown, globule of mercury 25 is located at the apex or lowermost portion of the cone when the marker is placed right side up over a film; which places a relatively small spot 70 on radiograph 61, as shown in Fig. 20. Fig. 20 shows the marker upside down. In this case, mercury 25 spreads out on base or plug portion 27 to form a relatively large radiopaque disc 72, as shown in Fig. 22.

Figure 23:
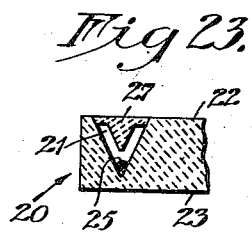
Figures 24, 25:
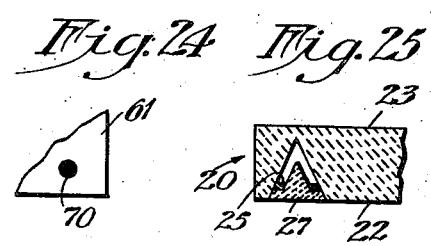
Figure 26:
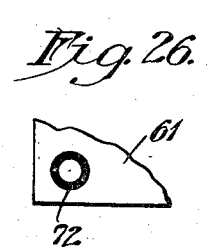

On the other hand, if the channel is formed by a cone-shaped space into which is fitted a smaller cone so as to provide an annular ring in cross-section, when the marker is placed right side up over the film, the mercury will flow to the apex and the spot on the radiograph will again be relatively small; but when the marker is placed wrong side up, that is, upside down, the mercury will flow to the base and the spot on the radiograph will appear as an annular ring. It is therefore easy to tell how the marker was placed over the film when the exposure was made. A marker of this construction is shown in Figs. 23 and 25. It will be seen that plug 27 is provided with a conical section that depends into cone-shaped space 21. In the position shown, with the marker right side up, mercury 25 settles in the apex of the cone-shaped space and would therefore leave a relatively small spot 70 on the radiograph, as shown in Fig. 24. Fig. 25 shows the marker upside down. This causes plug 27 to face the film. Mercury 25 therefore spreads around the base portion of the plug to form an annular ring which will, of course, cause characteristic spot 72 on the radiograph to be an annular ring, as shown in Fig. 26.

Figure 27:
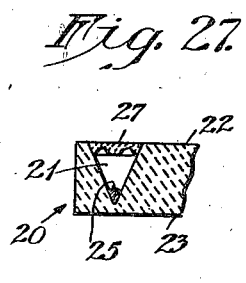
Figures 28, 29:
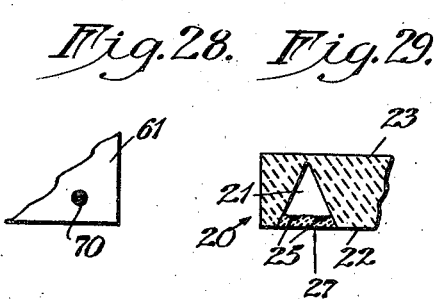
Figure 30:
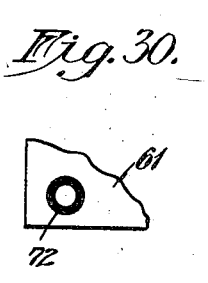

Instead of providing plug 27 with a cone-shaped section, depending deeply into conical space 21, it may, for example, have a slightly raised central portion to provide an annular recess into which the mercury may settle. Such a construction is shown in Figs. 27 and 29. In Fig. 27, the apex of the cone-shaped space is at the bottom of the marker facing the film. In this position, mercury 25 settles by gravity into the apex, as shown, to form a small spot, as shown in Fig. 28. In Fig. 29, however, the marker is shown upside down. In this position the mercury settles in the annular recess to form an annular ring 72, as shown in Fig. 30.

Figure 31:
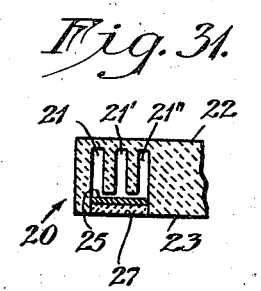
Figures 32, 33:
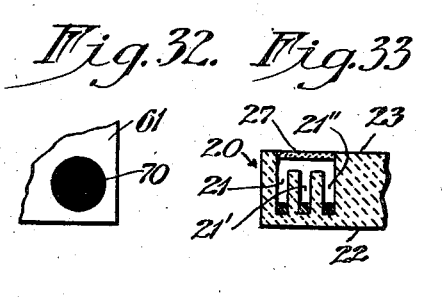
Figure 34:
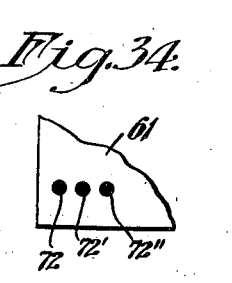

Another variation is to have the mercury indicator sub-divided into a plurality of globules. To this end, the marker may be constructed so as to allow the mercury to collect in a pool in a hollow space at the base of the marker when the marker is right side up and so arranged that two or more channels extend upwardly from the pool. When the marker is placed wrong side down, the mercury tends to sub-divide and flow down to the bottom of the upright channels, thus causing a plurality of spots to appear on the radiograph. The number and size of the spots therefore indicate how the marker was placed over the film when the exposure was made. Such a construction is illustrated in Figs. 31 and 33. The marker is provided with a plurality of upright, preferably vertical, channels 21, 21', 21'', etc., terminating at their bottoms in a space into which fits plug 27. As shown, the marker is right side up. This causes the mercury to settle to the bottom in the space, thus forming a relatively large disc which will cause characteristic spot 70 on the radiograph to have the same general shape, as shown in Fig. 32. Fig. 33 shows the marker wrong side up. When placed over a film in this position, the mercury tends to sub-divide and flow into upright channels 21, 21', 21'', etc. While the mercury may not sub-divide itself into equal amounts, in practice enough mercury flows into each of the upright channels so that when an exposure is made the radiograph will present a plurality of characteristic spots 72, 72', 72'', etc. It is therefore easy to determine how the marker was placed with respect to the film when the exposure was made.

The foregoing discussion does not, of course, exhaust all of the modifications of construction possible in the practice of the invention. To obtain a shifting of the characteristic mark of the nature shown in Figs. 5 to 18, inclusive, the conduit is tilted at an angle less than 90° with respect to the top and bottom of the holder, as shown in Figs. 1 to 3, inclusive; that is, the conduit is not perpendicular to the top and bottom, so that the shift of the characteristic spot will be easier to observe. On the other hand, when the change in the characteristic spot is essentially one of size and shape that is easily observable, as shown in Figs. 19 to 34, inclusive, the channel or channels are preferably tilted at an angle of 90° to the top and bottom; although they may, of course also be tilted at an angle less than 90°. The former practice is preferable because the channel or channels are more easily provided in the holder, and, since the change in size and shape of the spot is readily observed in any event, there is no need to combine it with a readily observed shift in position of the spot. While the use of a cover is described in the specific example illustrated by Figs. 1 and 2, this is, of course, not absolutely necessary. While the use of the marker is illustrated with particular reference to the examination of anatomical parts, it will be clear to those skilled in the art that the practice of the invention also has a number of industrial and other applications. The construction of the marker is such that it is possible promptly to determine from the radiograph precisely how the marker was presented to the film when the exposure was made.

I claim:

1. In a marker for placing identifying data on radiographs and the like, the improvement comprising a holder for identifying insignia opaque to X-rays, the holder itself being at least in part transparent to X-rays, a conduit associated with the holder, the conduit being tilted with respect to the bottom and the top of the holder so that an X-ray opaque substance in the conduit may readily seek the lower end of the conduit by gravity when the holder is placed on its bottom or its top.

2. In a marker for placing identifying data on X-ray pictures and the like, the improvement comprising a holder for identifying insignia opaque to X-rays, the holder itself being at least in part transparent to X-rays, a conduit in a transparent part of the main body of the holder, the conduit being tilted with respect to the bottom and the top of the holder so that an X-ray opaque substance in the conduit may readily seek the lower end of the conduit by gravity when the holder is placed on its bottom or its top.

3. In a marker for placing identifying data on X-ray pictures and the like, the improvement comprising a holder for identifying insignia opaque to X-rays, the holder itself being at least in part transparent to X-rays, a conduit associated with the holder, the conduit being tilted with respect to the bottom and the top of the holder so that an X-ray opaque substance in the conduit may readily seek the lower end of the conduit by gravity when the holder is placed on its bottom or its top, and means associated with the holder for receiving and holding the opaque insignia against movement relative to the holder.

4. In a marker for placing identifying data on X-ray pictures and the like, the improvement comprising a holder for identifying insignia opaque to X-rays, the holder itself being at least in part transparent to X-rays, a conduit in a transparent part of the main body of the holder, the conduit being tilted with respect to the bottom and the top of the holder so that an X-ray opaque substance in the conduit may readily seek the lower end of the conduit by gravity when the holder is placed on its bottom or its top, and spaced recesses in the top portion of the holder to receive and hold the opaque insignia against movement relative to the holder.

5. In a marker for placing identifying data on X-ray pictures and the like, the improvement comprising a holder for identifying insignia opaque to X-rays, the holder itself being at least in part transparent to X-rays, a conduit in a transparent part of the main body of the holder, the conduit being tilted with respect to the bottom and the top of the holder so that an X-ray opaque substance in the conduit may readily seek the lower end of the conduit by gravity when the holder is placed on its bottom or its top, spaced recesses in the top portion of the holder to receive and hold the opaque insignia against movement relative to the holder, and a movable top placeable on said top portion of the holder to keep the opaque insignia in their respective recesses.

6. In a marker for placing identifying data on X-ray pictures and the like, the improvement comprising a holder for identifying insignia opaque to X-rays, the holder itself being at least in part transparent to X-rays, a conduit in and extending laterally of a transparent end portion of the main body of the holder, the conduit being tilted with respect to the bottom and the top of the holder so that an X-ray opaque substance in the conduit may readily seek the lower end of the conduit by gravity when the holder is placed on its bottom or its top, spaced recesses in an indented top portion of the holder adjacent the end portion containing the conduit to receive and hold the opaque insignia against movement relative to the holder, and a movable top cover placeable on said indented top portion of the holder to keep the opaque insignia in their respective recesses.

RICHARD A. RENDICH.

Certificate of Correction

Patent No. 2,433,480.   December 30, 1947.

RICHARD A. RENDICH

It is hereby certified that errors appear in the printed specification of the above numbered patent requiring correction as follows: Column 2, line 7, for the word "latter" read *letter*; column 10, line 55, claim 2; line 66, claim 3; column 11, line 4, claim 4; line 18, claim 5; for "X-ray pictures" read *radiographs*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*